(12) United States Patent
Feulner et al.

(10) Patent No.: US 10,293,951 B2
(45) Date of Patent: May 21, 2019

(54) TAKEOFF POWER MANAGEMENT SYSTEM AND METHOD FOR GAS TURBINE ENGINES

(71) Applicant: UNITED TECHNOLOGIES CORPORATION, Farmington, CT (US)

(72) Inventors: Matthew R. Feulner, West Hartford, CT (US); Ronald S. Walther, West Granby, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 326 days.

(21) Appl. No.: 15/072,869

(22) Filed: Mar. 17, 2016

(65) Prior Publication Data

US 2017/0267366 A1 Sep. 21, 2017

(51) Int. Cl.
| | |
|---|---|
| *B64D 27/10* | (2006.01) |
| *B64D 31/06* | (2006.01) |
| *B64D 31/12* | (2006.01) |
| *G05D 1/06* | (2006.01) |
| *F02C 9/28* | (2006.01) |

(52) U.S. Cl.
CPC ............. *B64D 31/06* (2013.01); *B64D 27/10* (2013.01); *B64D 31/12* (2013.01); *F02C 9/28* (2013.01); *G05D 1/0661* (2013.01); *F05D 2270/051* (2013.01); *F05D 2270/102* (2013.01); *F05D 2270/1022* (2013.01)

(58) Field of Classification Search
CPC ..................................................... B64D 27/10
See application file for complete search history.

(56) References Cited

U.S. PATENT DOCUMENTS

| | | | |
|---|---|---|---|
| 4,122,522 A | 10/1978 | Smith | |
| 4,980,833 A | 12/1990 | Milligan et al. | |
| 6,722,610 B1 | 4/2004 | Rawdon et al. | |
| 7,946,165 B2 | 5/2011 | Cahill | |
| 8,615,335 B2 | 12/2013 | Couey et al. | |
| 8,660,721 B2* | 2/2014 | Fernandez | B64D 31/12 701/15 |
| 2008/0029653 A1 | 2/2008 | Johnson | |
| 2008/0275597 A1* | 11/2008 | Gaulmin | B64D 31/12 701/3 |

(Continued)

FOREIGN PATENT DOCUMENTS

CN 101870363 A 10/2010

OTHER PUBLICATIONS

European Search Report for European Patent Application No. 17160897.9, completed Jul. 27, 2017.

*Primary Examiner* — Thomas G Black
*Assistant Examiner* — Ce Li Li
(74) *Attorney, Agent, or Firm* — Carlson, Gaskey & Olds, P.C.

(57) ABSTRACT

A gas turbine engine according to an exemplary aspect of the present disclosure includes, among other things, a control unit to command the gas turbine engine to perform one of a rolling takeoff procedure and an unrestricted takeoff procedure. The control unit is configured command the gas turbine engine to perform the rolling takeoff procedure when information required to determine whether the unrestricted takeoff procedure can be performed is unavailable to the control unit.

18 Claims, 3 Drawing Sheets

(56) References Cited

U.S. PATENT DOCUMENTS

| | | | |
|---|---|---|---|
| 2010/0070112 A1* | 3/2010 | Couey | F02C 9/28 |
| | | | 701/3 |
| 2011/0040431 A1 | 2/2011 | Griffith et al. | |
| 2013/0110327 A1* | 5/2013 | Fernandez | B64D 31/12 |
| | | | 701/15 |
| 2013/0211636 A1 | 8/2013 | Martins et al. | |
| 2013/0327014 A1* | 12/2013 | Moulebhar | F02K 3/065 |
| | | | 60/226.2 |
| 2014/0018980 A1* | 1/2014 | Bollapragada | G08G 5/0021 |
| | | | 701/10 |
| 2014/0203136 A1* | 7/2014 | Endres | B64F 1/002 |
| | | | 244/50 |
| 2015/0362920 A1* | 12/2015 | McGregor | G05D 1/0214 |
| | | | 701/15 |

* cited by examiner

TAKEOFF POWER MANAGEMENT SYSTEM AND METHOD FOR GAS TURBINE ENGINES

BACKGROUND

This disclosure relates to a takeoff power management system and method for a gas turbine engine.

Gas turbine engines typically include a compressor section, a combustor section, and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

In order to initiate takeoff of an aircraft, gas turbine engines are powered to full power, which is sometimes referred to as takeoff power. In one known takeoff procedure, known as a static takeoff procedure (which is a type of "unrestricted" takeoff procedure), the aircraft is held stationary at the end of a runway while the gas turbine engines are powered to full power. Once the gas turbine engines reach full power, the brakes of the aircraft are released and the aircraft is allowed to accelerate down the runway.

Another type of takeoff procedure is known as a rolling takeoff procedure. In a rolling takeoff procedure, the aircraft is allowed to accelerate down the runway while the gas turbine engines are run at an intermediate power. After accelerating at intermediate power for a period of time, the gas turbine engines are run at full power.

In some known systems, the pilot has the discretion to initiate a particular takeoff procedure. Various factors, such as runway length, may determine whether a static takeoff or a rolling takeoff is desirable. However, some gas turbine engines are rated for static takeoffs only during certain operating conditions. If an operating condition, such as ground wind speed, exceeds a predetermined threshold value, a static takeoff is not recommended. Information relating to ground wind speed is typically checked by the pilot prior to takeoff, and the pilot initiates a particular takeoff procedure based on the ground wind speed value and corresponding rating of the gas turbine engine.

SUMMARY

A gas turbine engine according to an exemplary aspect of the present disclosure includes, among other things, a control unit to command the gas turbine engine to perform one of a rolling takeoff procedure and an unrestricted takeoff procedure. The control unit is configured command the gas turbine engine to perform the rolling takeoff procedure when information required to determine whether the unrestricted takeoff procedure can be performed is unavailable to the control unit.

In a further non-limiting embodiment of the foregoing engine, when the information is available to the control unit, the control unit is configured to initiate the rolling takeoff procedure if the information exceeds a predetermined threshold value.

In a further non-limiting embodiment of either of the foregoing engines, the information includes a ground wind speed.

In a further non-limiting embodiment of any of the foregoing engines, the ground wind speed is a cross-wind speed.

In a further non-limiting embodiment of any of the foregoing engines, following initiation of the rolling takeoff procedure, the control unit is configured to power the gas turbine engine to full power after running at intermediate power for a period of time.

In a further non-limiting embodiment of any of the foregoing engines, the period of time includes a period of time to allow the ground speed of an aircraft to reach a predetermined ground speed.

In a further non-limiting embodiment of any of the foregoing engines, the control unit is configured to determine the ground speed by integrating the acceleration of the aircraft relative to the time since initiation of the rolling takeoff procedure.

In a further non-limiting embodiment of any of the foregoing engines, the initiation of the rolling takeoff procedure is indicated by a release of a brake of the aircraft.

In a further non-limiting embodiment of any of the foregoing engines, the unrestricted takeoff procedure is a static takeoff procedure and includes powering the gas turbine engine to full power before accelerating an aircraft.

In a further non-limiting embodiment of any of the foregoing engines, the rolling takeoff procedure includes accelerating the aircraft while running the gas turbine engine at an intermediate power for a period of time before running the gas turbine engine at full power.

In a further non-limiting embodiment of any of the foregoing engines, full power is a level of power capable of allowing the aircraft to takeoff.

A method according to an exemplary aspect of the present disclosure includes, among other things, initiating a rolling takeoff procedure when information required to determine whether an unrestricted takeoff procedure can be performed is unavailable to a control unit.

In a further non-limiting embodiment of the foregoing method, the method includes initiating a rolling takeoff procedure when the information is available to the control unit and the information exceeds a predetermined threshold value.

In a further non-limiting embodiment of either of the foregoing methods, the information required to determine whether the unrestricted takeoff procedure can be performed includes a ground wind speed.

In a further non-limiting embodiment of any of the foregoing methods, the rolling takeoff procedure comprises accelerating an aircraft by running a gas turbine engine at an intermediate power for a period of time, and accelerating the aircraft by running the gas turbine engine at full power after the period of time.

In a further non-limiting embodiment of any of the foregoing methods, the period of time is a time to allow the aircraft to reach a predetermined ground speed.

In a further non-limiting embodiment of any of the foregoing methods, the unrestricted takeoff procedure is a static takeoff procedure.

In a further non-limiting embodiment of any of the foregoing methods, the method includes coordinating operation of a plurality of gas turbine engines to prevent thrust asymmetry.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE DRAWINGS

The drawings can be briefly described as follows.

DETAILED DESCRIPTION

Figure 1:
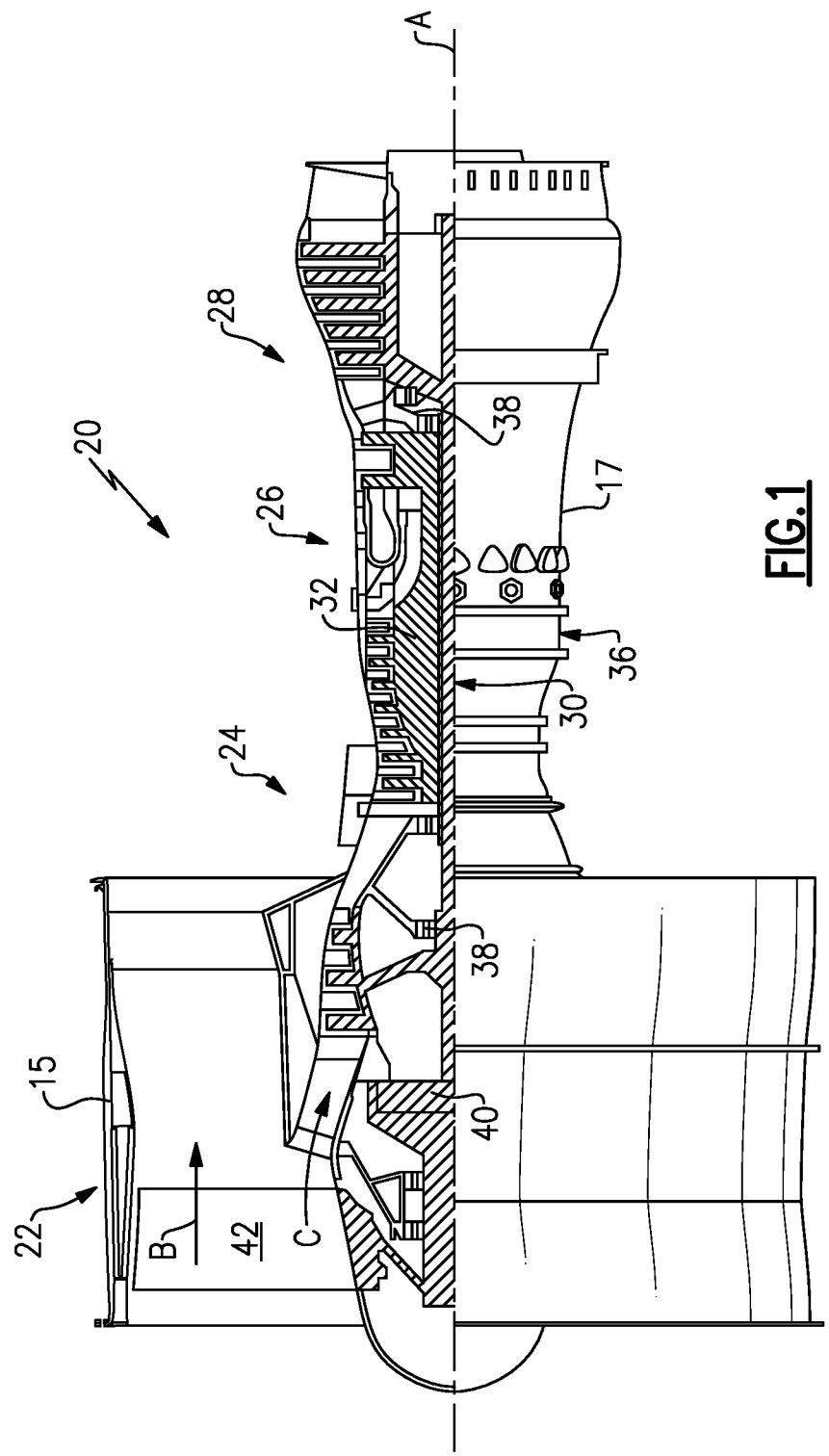
FIG. 1 illustrates a schematic, cross-sectional view of a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26, and a turbine section 28. The fan section 22 drives air along a bypass flow path B in a bypass duct defined within a fan case 15 and located radially outward from a core engine case 17. The compressor section 24 drives air along a core flow path C for compression and communication into the combustor section 26, and then expansion through the turbine section 28.

The exemplary gas turbine engine 20 generally includes a low speed spool 30 and a high speed spool 32 mounted for rotation about an engine central longitudinal axis A relative to an engine static structure 36 via several bearing systems 38. The low speed spool 30 is in communication with a speed change mechanism 40, such as an epicyclic gear train, that allows a fan 42 on the fan section 22 to rotate at a lower speed than the low speed spool 30.

Figure 2:
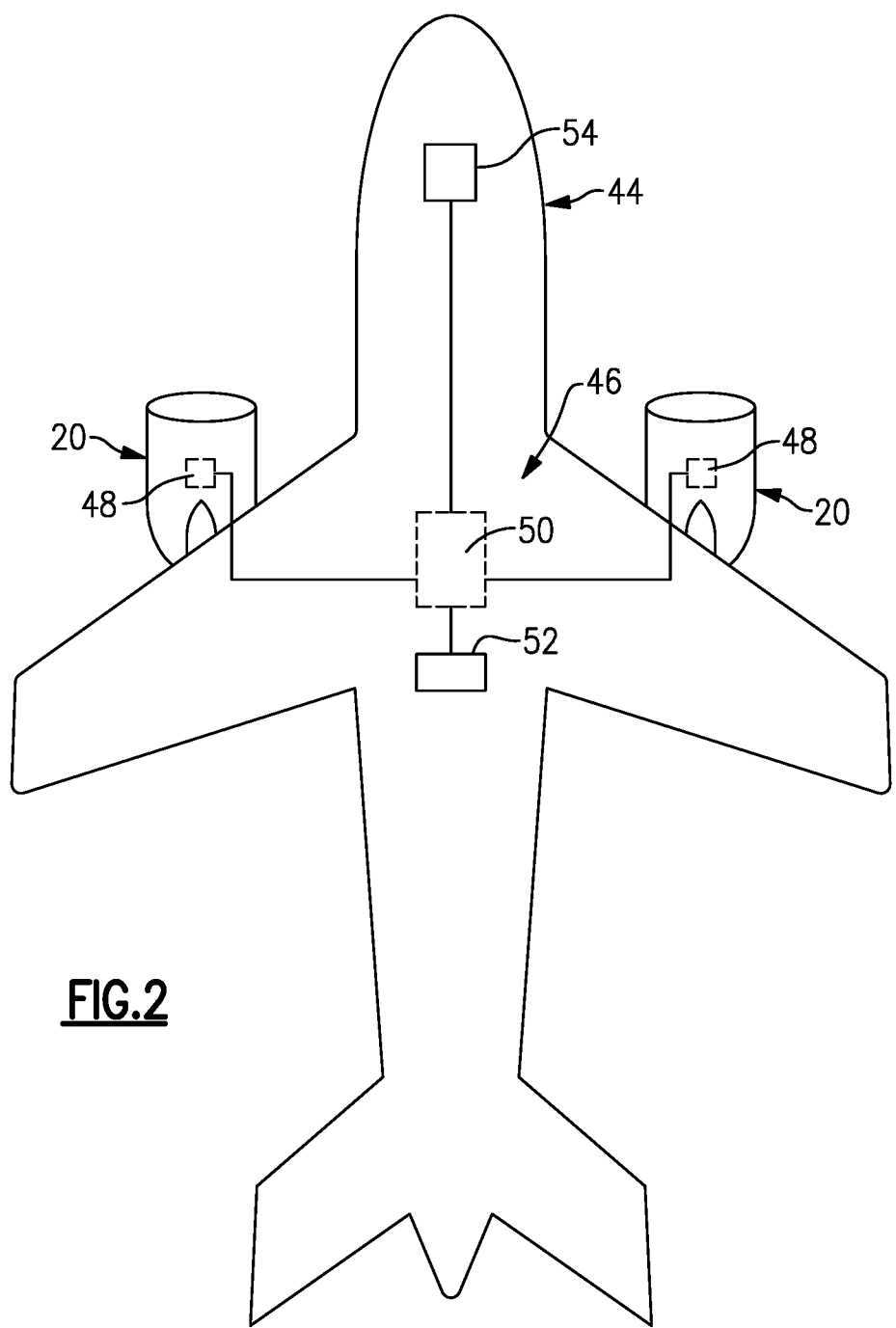
FIG. 2 schematically illustrates an example aircraft.

FIG. 2 schematically illustrates an aircraft 44 including at least one gas turbine engine 20. In the example of FIG. 2, the aircraft 44 includes two gas turbine engines 20. It should be understood that this disclosure extends to aircraft having any number of gas turbine engines. Further, while a particular gas turbine engine 20 is illustrated in FIG. 1, it should be understood that this disclosure extends to all types of gas turbine engines.

As shown in FIG. 2, the gas turbine engines 20 are in communication with a control unit 46, which is configured to provide commands to the gas turbine engines 20 to control their operation. In particular, the control unit 46 is configured to initiate an automated takeoff procedure that requires minimal, or no, pilot input. The aircraft 44 and gas turbine engines 20, together with the control unit 46, provide an example takeoff power management system.

In this disclosure, reference to the control unit 46 refers to any controller on the aircraft 44 configured to control operation of the gas turbine engines 20, including, as examples, an Electronic Engine Controller (EEC) 48 and a Full Authority Digital Engine Control (FADEC) 50. The control unit 46 includes electronics, software, or both, to perform the necessary control functions for operating the gas turbine engines 20. Although the control unit 46 is shown as multiple devices in FIG. 2, the control unit 46 may be provided by a single device, or by multiple software controllers within one or more hardware devices.

In FIG. 2, the control unit 46 is electrically coupled to a plurality of areas of the aircraft 44, including a braking system 52 and a cockpit 54 of the aircraft 44. The control unit 46 is configured to receive information from the braking system 52 including signals indicating whether the brakes are applied or have been released. The control unit 46 is further configured to send signals to the cockpit 54 to inform the pilot(s) of the various operating conditions of the aircraft 44, including the operating conditions of the gas turbine engines 20.

In order for the aircraft 44 to take off, the gas turbine engines 20 are powered to full power, which is sometimes referred to as takeoff power or N1. In one example, the control unit 46 is configured to initiate one of an unrestricted takeoff procedure or a rolling takeoff procedure by sending corresponding signals to the gas turbine engines 20. In this disclosure an "unrestricted" takeoff procedure refers to any modification to a rolling takeoff procedure, including a static takeoff procedure. Further, the control unit 46 is configured to synchronize and coordinate operation of the engines 20 (in examples where the aircraft 44 has more than one engine 20) to prevent thrust asymmetry from one engine being allowed to perform an unrestricted takeoff and the other a rolling takeoff.

In a static takeoff procedure (which, again, is one type of "unrestricted" takeoff procedure), the aircraft 44 is held stationary at the end of a runway by the braking system 52, for example, while the gas turbine engines 20 are powered to full power. Once the gas turbine engines 20 reach full power, the brakes of the aircraft 44 are released and the aircraft 44 is allowed to accelerate down the runway. A static takeoff procedure may be beneficial in instances where there is a short runway, and is also useful to confirm that the gas turbine engines 20 are capable of reaching full power prior to releasing the brakes.

In a rolling takeoff procedure, the aircraft 44 is allowed to accelerate down the runway while the gas turbine engines 20 are running at an intermediate power, which is less than full power. In one example, the intermediate power is 60% of full power. After accelerating at intermediate power for a period of time, the gas turbine engines 20 are then run at full power to allow the aircraft 44 to take off. Rolling takeoffs may be beneficial because they result in a lower overall takeoff time, and they provide additional passenger comfort because of the smoother acceleration.

Some gas turbine engines are rated and provided with an operational envelope limiting the conditions in which a static takeoff procedure is recommended. In some conditions, such as a high ground wind speed, or a high ground cross-wind, a static takeoff is not desired because of the increased likelihood that non-uniform air flow will enter the gas turbine engines 20. Non-uniform air flow can cause excessive stress and/or damage to the blades of the fan 42. Further, in some cases, attempting a static takeoff in such conditions may even cause an engine surge. While ground wind speed is one example condition, other conditions come within the scope of this disclosure, including ground head wind speeds, ground tail wind speeds, temperature, barometric pressure, weather, etc.

Figure 3:
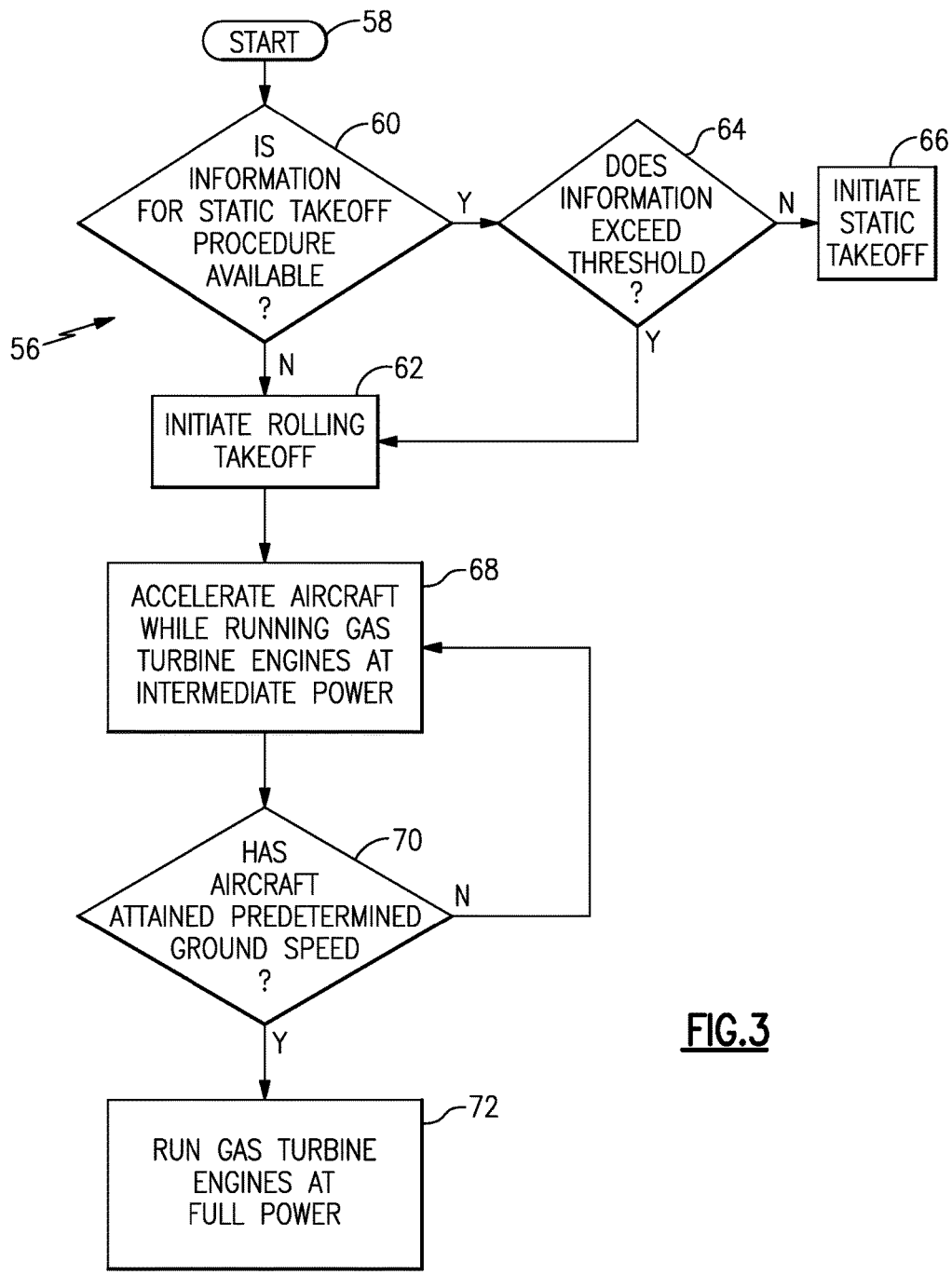
FIG. 3 is a flow chart representative of an example takeoff method.

FIG. 3 illustrates an example takeoff method 56 that avoids the potential negative impacts associated with performing a static takeoff procedure outside of a rated operational envelope. In the method 56, when initiating a takeoff, at 58, the control unit 46 detects whether the information required to determine whether a static takeoff procedure can be performed is available to the control unit, at 60. Example information includes a ground wind speed, such as a crosswind speed.

If ground wind speed information, for example, is unavailable to the control unit 46, then the control unit 46 itself cannot make a determination of whether to allow a static takeoff. Thus, at 62, a rolling takeoff is initiated. Before initiating a rolling takeoff, the control unit 46 delivers a message to the cockpit 54 indicating that a rolling takeoff is going to be initiated.

In the example of FIG. 2, the aircraft 44 does not include any sensors that report ground wind speed directly to the control unit 46, and the information relating to ground wind speed is not otherwise available to the control unit 46. Alternatively, if the aircraft 44 did include ground wind speed sensors, that information may still not be available directly to the control unit 46. For instance, that information could be delivered only to the pilot. In another example, the sensors, while present, may be experiencing a temporary outage and are not detecting or reporting ground wind speed to the control unit 46. In any of these instances, the control unit 46 would initiate the rolling takeoff procedure, at 62.

While ground wind speed may be known to the pilot or air traffic controller, for example, this disclosure reduces pilot workload. In this disclosure, the pilot does not need to monitor wind speed during a takeoff procedure, nor does the pilot need to make an independent judgment regarding whether to initiate a static or a rolling takeoff procedure. Rather, the control unit 46 makes that judgment based on the information, or lack thereof, provided directly to the control unit 46.

If the aircraft 44 had included sensors for determining ground wind speed, for example, the control unit 46 would determine whether the ground wind speed exceeded a predetermined threshold, at 64. The predetermined threshold is defined by the rated operational envelope of the engine, and is unique to the particular model of gas turbine engine 20. The predetermined threshold corresponds to a ground wind speed that may increase the likelihood of non-uniform air flow entering the gas turbine engine 20 during a static takeoff. In one example, the predetermined threshold is 20 knots (about 10.3 m/s).

If the predetermined value is exceeded, a rolling takeoff would be initiated, at 62. If not, the control unit would initiate a static takeoff, at 66. In either case, the control unit 46 would deliver a message to the cockpit 54 indicating the type of takeoff procedure that is going to be initiated.

When a rolling takeoff is initiated, the control unit 46, at 68, is configured to accelerate the aircraft 44 while running the gas turbine engines at an intermediate power for a period of time. The intermediate power, in one example, is 60% of full power. The aircraft 44 is allowed to run at the intermediate power to allow the ground speed of the aircraft 44 to reach a predetermined ground speed, at 70. Once the aircraft 44 has reached the predetermined ground speed, the control unit 46 commands the gas turbine engines 20 to run at full power, at 72, to allow for takeoff.

The predetermined ground speed may be selected to correspond to a speed where the likelihood of non-uniform air flow entering the gas turbine engines 20 is relatively minimal. In a further example, the predetermined ground speed may be selected to correspond to a speed where the likelihood of non-uniform air flow entering the gas turbine engines is substantially zero. The predetermined ground speed, in one example, is 60 knots (about 30.9 m/s).

In some examples, the ground speed of the aircraft 44 is not readily available to the control unit 46. In those examples, the ground speed of the aircraft 44 can be calculated by the control unit 46 by integrating the acceleration the aircraft 44 relative to time. The time is known, in one example, as a time from the release of the braking system 52, or a time from an initiation of the rolling takeoff command. Aircraft ground speed can be determined in other ways, however, such as through a global positioning system (GPS).

Again, this disclosure reduces pilot workload during takeoff. With this disclosure, pilots are not required to monitor conditions, such as ground wind speed, etc., during takeoff. Thus, the pilot is not required to make an independent judgment as to the type of takeoff procedure that is performed. Further, while static takeoffs may be beneficial in some instances, this disclosure essentially defaults to rolling takeoffs in the absence of necessary information being provided to the control unit. Therefore, this disclosure reduces errors in independent pilot judgment, and otherwise protects the gas turbine engines from damage due to a static takeoff procedure being initiated outside of an engine's rated operational envelope.

Although the different examples have the specific components shown in the illustrations, embodiments of this disclosure are not limited to those particular combinations. It is possible to use some of the components or features from one of the examples in combination with features or components from another one of the examples.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. A gas turbine engine, comprising:
a control unit configured to command the gas turbine engine to perform one of a rolling takeoff procedure and an unrestricted takeoff procedure, wherein the control unit is configured to detect whether information required to determine whether an unrestricted takeoff procedure can be performed is available to the control unit, and wherein the control unit is configured to command the gas turbine engine to perform the rolling takeoff procedure when the information is unavailable to the control unit.

2. The gas turbine engine as recited in claim 1, wherein, when the information is available to the control unit, the control unit is configured to initiate the rolling takeoff procedure if the information exceeds a predetermined threshold value.

3. The gas turbine engine as recited in claim 1, wherein the information includes a ground wind speed.

4. The gas turbine engine as recited in claim 3, wherein the ground wind speed is a cross-wind speed.

5. The gas turbine engine as recited in claim 1, wherein, following initiation of the rolling takeoff procedure, the control unit is configured to power the gas turbine engine to full power after running at intermediate power for a period of time.

6. The gas turbine engine as recited in claim 5, wherein the period of time includes a period of time to allow the ground speed of an aircraft to reach a predetermined ground speed.

7. The gas turbine engine as recited in claim 6, wherein the control unit is configured to determine the ground speed by integrating the acceleration of the aircraft relative to the time since initiation of the rolling takeoff procedure.

8. The gas turbine engine as recited in claim 7, wherein the initiation of the rolling takeoff procedure is indicated by a release of a brake of the aircraft.

9. The gas turbine engine as recited in claim 1, wherein the unrestricted takeoff procedure is a static takeoff procedure and includes powering the gas turbine engine to full power before accelerating an aircraft.

10. The gas turbine engine as recited in claim 9, wherein the rolling takeoff procedure includes accelerating the aircraft while running the gas turbine engine at an intermediate power for a period of time before running the gas turbine engine at full power.

11. The gas turbine engine as recited in claim 10, wherein full power is a level of power capable of allowing the aircraft to takeoff.

12. A method, comprising:
    detecting whether information required to determine whether an unrestricted takeoff procedure can be performed is available to a control unit; and
    initiating a rolling takeoff procedure when the information is unavailable to the control unit.

13. The method as recited in claim 12, further comprising:
    initiating a rolling takeoff procedure when the information is available to the control unit and the information exceeds a predetermined threshold value.

14. The method as recited in claim 12, wherein the information required to determine whether the unrestricted takeoff procedure can be performed includes a ground wind speed.

15. The method as recited in claim 12, wherein the rolling takeoff procedure comprises:
    accelerating an aircraft by running a gas turbine engine at an intermediate power for a period of time; and
    accelerating the aircraft by running the gas turbine engine at full power after the period of time.

16. The method as recited in claim 12, wherein the unrestricted takeoff procedure is a static takeoff procedure.

17. The method as recited in claim 12, further comprising coordinating operation of a plurality of gas turbine engines to prevent thrust asymmetry.

18. A method, comprising:
    detecting whether information required to determine whether an unrestricted takeoff procedure can be performed is available to a control unit; and
    initiating a rolling takeoff procedure when the information is unavailable to the control unit,
    wherein the rolling takeoff procedure comprises:
        accelerating an aircraft by running a gas turbine engine at an intermediate power for a period of time; and
        accelerating the aircraft by running the gas turbine engine at full power after the period of time, and
        wherein the period of time is a time to allow the aircraft to reach a predetermined ground speed.

* * * * *